United States Patent [19]
Baney

[11] Patent Number: 5,621,749
[45] Date of Patent: Apr. 15, 1997

[54] PRASEODYMIUM-DOPED FLUORIDE FIBER UPCONVERSION LASER FOR THE GENERATION OF BLUE LIGHT

[75] Inventor: Douglas M. Baney, Los Altos, Calif.

[73] Assignee: Hewlett-Packard Company, Palo Alto, Calif.

[21] Appl. No.: 524,058

[22] Filed: Sep. 6, 1995

[51] Int. Cl.$^6$ ........................................ H01S 3/09
[52] U.S. Cl. .................. 372/69; 372/41; 372/6; 372/102
[58] Field of Search ................. 372/6, 102, 69, 372/41

[56] References Cited

U.S. PATENT DOCUMENTS

| | | | |
|---|---|---|---|
| 5,067,134 | 11/1991 | Oomen | 372/6 |
| 5,191,586 | 3/1993 | Hubner | 372/6 |
| 5,226,049 | 7/1993 | Grubb | 372/6 |
| 5,235,604 | 8/1993 | Chinen | 372/6 |
| 5,251,062 | 10/1993 | Snitzer | 372/6 |
| 5,305,335 | 4/1994 | Ball et al. | 372/6 |
| 5,309,452 | 5/1994 | Ohishi et al. | 372/6 |
| 5,311,525 | 5/1994 | Pantell et al. | 372/6 |
| 5,313,477 | 5/1994 | Estertowitz et al. | 372/6 |
| 5,379,149 | 1/1995 | Snitzer et al. | 372/6 |

OTHER PUBLICATIONS

Kaminskii et al; "Stimulated Radiation for Single Crystals of BaYb/2 F/6–Pr+3";Plenum Pub.Corp;1987.

Zhao et al., "22 mW blue output power from a $Pr^{3+}$ fluoride fibre upconversion laser", Optics Communications, 1 Feb. 1995.

Smart et al., "CW Room Temperature Upconversion Lasing at Blue, Green and Red Wavelengths in Infrared–Pumped $Pr^{3+}$–Doped Fluoride Fibre", Electronics Letters, 4 Jul. 1991.

Allain et al., "Red Upconversion Yb–Sensitised Pr Fluoride Fibre Laser Pumped in 0.8 um Region", Electronics Letters, 20 Jun. 1991.

Piehler et al., "Laser–diode–pumped red and green up–conversion fibre lasers", Electronics Letters, 14 Oct. 1993.

Allain et al., "Energy Transfer in $Pr^{3+}/Yb^{3+}$–Doped Fluorozirconate Fibres", Electronics Letters, 6 Jun. 1991.

Ohishi et al., "Gain Characteristics of $Pr^{3+}$–$YB^{3+}$ Codoped Fluoride Fiber for 1.3 um Amplification", IEEE Transactions Photonics Technology Letters, vol. 3, No. 11, Nov. 1991.

Zhao & Poole, "Efficient blue $Pr^{3+}$–doped fluoride fibre upconversion laser", Electronics Letters, 9 Jun. 1994.

Allain et al., "Blue Upconversion Fluorozirconate Fibre Laser", Electronics Letters, 1 Feb. 1990.

Primary Examiner—Leon Scott, Jr.

[57] ABSTRACT

An conversion laser design for the generation of blue light incorporates fiber Bragg gratings, mode-matching fibers, pump noise reduction, pump combining, and a self-oscillating pumping scheme, allowing the use of a single wavelength pump laser to pump through a cross-relaxation method of $Yb^{3+}$ to $Pr^{3+}$, as well as a self-oscillating pumping method. The use of narrowband mirrors, such as FBGs, is also disclosed for the upconversion laser to allow suppression of parasitic oscillators.

18 Claims, 5 Drawing Sheets

PRASEODYMIUM-DOPED FLUORIDE FIBER UPCONVERSION LASER FOR THE GENERATION OF BLUE LIGHT

BACKGROUND OF THE INVENTION

1. Technical Field

The invention relates to lasers. More particularly, the invention relates to an upconversion laser for the generation of blue light.

2. Description of the Prior Art

Generation of laser light at blue visible wavelengths is of interest in disk memory, large displays, and biosciences. The wavelength regions in the green and blue have been difficult to attain with semiconductor lasers though ongoing research is being performed in the field. Visible blue lasers have been achieved with Argon-Ion gas lasers. These lasers consume large amounts of power, are relatively expensive, and need special cooling requirements which make them unwieldy for instrumentation applications such as in the biosciences. Efforts are also being directed at blue-light generation using doubling structures and direct gap semiconductor lasers.

Infrared-pumped upconversion lasers in glass fiber are potentially compact sources for visible CW radiation. Blue, green, orange, and red upconversion laser oscillation has been demonstrated in $Pr^{3+}$ doped fluoride fiber pumped by two Ti:sapphire lasers operating at 835 and 1010 nm (see, for example R. G. Smart et al, CW room temperature upconversion lasing at blue, green and red wavelengths in infrared-pumped $Pr^{3+}$-doped fluoride fibre, Electron. Lett., vol. 27, pp. 1307–1309 (1991)). See, also J. Y. Allain et al, Blue upconversion fluorozirconate fibre laser, Electron. Lett., vol. 26, pp. 166–168, (1990).

Using a Ti:sapphire laser operating near 850 nm as a pump source, Allain et al (Electron. Lett., vol. 27, pp. 1156–1157 (1991)) were able to generate 635 nm laser light from $Yb^{3+}/Pr^{3+}$-codoped fluoride fiber. Later, using two semiconductor laser diode pumps, one operating at 985 nm or 1016 nm, the other at 833 nm, Piehler et al (Electron. Lett., vol. 29, No. 21, pp. 1857–1858 (1993)), were able to obtain upconversion lasing at 521 and 635 nm. A laser design for 450 nm light generation using upconversion lasing in trivalent Thulium-doped-fluoride glass has also been previously disclosed (see, for example Emmanuel W. J. L. Oomens, Device for Generating Blue Laser Light, U.S. Pat. No. 5,067,134, 19 Nov. 1991).

Figure 1:
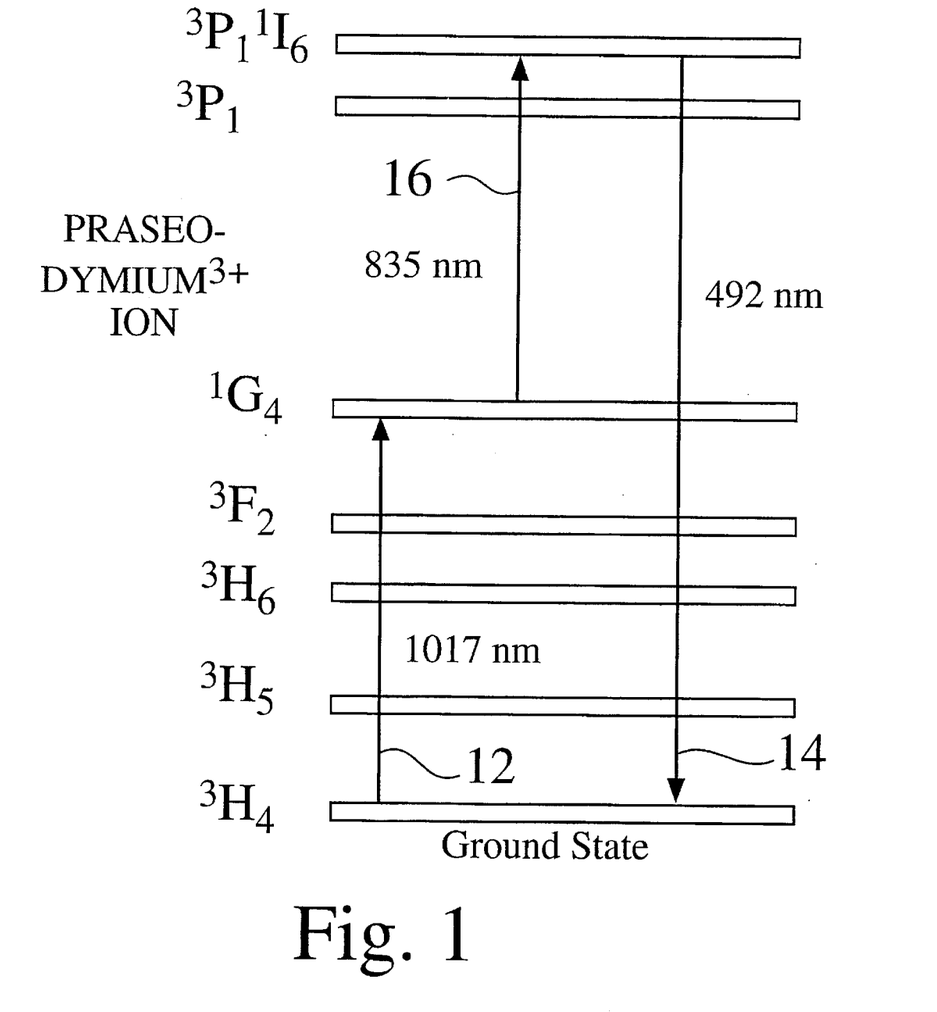
FIG. 1 is an energy level diagram showing a pumping method and transitions for a $Pr^{3+}$ fluoride fiber upconversion laser.

FIG. 1 is an energy level diagram showing a pumping method and transitions for a $Pr^{3+}$ fluoride fiber upconversion laser. Dual-wavelength pumping or single wavelength pumping can be used in such laser. Because the lifetimes of the energy states become relatively long-lived in a fluoride glass host, absorption of pump photons is possible from various intermediate energy levels between the desired $^3P_0$ state (39 μs) and the ground state (see, for example D. Piehler et al, Laser-diode-pumped red and green upconversion fibre lasers, Electron. Lett., vol. 29, No. 21, pp. 1857–1858 (1993)). Thus, it is easily imagined that one pump photon 12 could create GSA (ground state absorption) to the $^1G_4$ (100 μs) level and another pump photon 16 could boost the ion from that energy level or some decayed level above the ground state to the desired $^3P_0$ level. The excited ion 14 in this state has favorable branching to the ground state which is used as a lasing transition.

Because there are multiple transitions, multiple pump combinations could be envisioned to achieve the desired pumping of the $^3P_0$ (blue) level. Published reports have shown simultaneous pumping at 835 nm and 1017 nm can sufficiently invert the blue level in a fluoride glass to achieve lasing (see, for example Y. Zhao et al, Efficient blue $Pr^{3+}$-doped fluoride fibre upconversion laser, Electron. Lett., vol. 30, pp. 967–968 (1994)). Using Ti-sapphire lasers operating at 1010 nm and 835 nm, researchers have generated blue laser light at 491 nm from Pr-doped fluoride fiber.

The use of a trivalent ytterbium sensitizer ion for populating the $Pr^{3+}–>^1G_4$ level (see FIG. 2) has been proposed for application to 1.3 μm amplification (see J. Y. Allain et al, Energy transfer in $Pr^{3+}/Yb^{3+}$-doped fluorozirconate fibres, Electron. Lett., vol. 27, pp. 1012–1014, (1991)), and upconversion lasers (see J. Y. Allain et al, Red upconversion Yb-sensitized Pr fluoride fibre laser pumped in the 0.8 μm region, Electron. Lett., vol. 27, pp. 1156–1157 (1991)). The advantages of codoping with $Yb^{3+}$ are three-fold. The broad absorption band permits a wide pump wavelength range for activating the $Yb^{3+}$ ion and cross-relaxation to other ions. Strong absorption permits shorter lengths of fluoride fiber that still yield adequate pump absorption. The simple energy structure of the $Yb^{3+}$ ion reduces the possibilities for backwards energy transfer from the activator ion to the $Yb^{3+}$ sensitizer ion, thus limiting the lifetime reduction of the 3P0 metastable state.

The addition of a sensitizer such as $Yb^{3+}$ has also been reported (see, for example J. Y. Allain et al, Red upconversion Yb-sensitized Pr fluoride fibre laser pumped in the 0.8 μm region, Electron. Lett., vol. 27, pp. 1156–1157 (1991); Y. Ohishi, Gain characteristics of $Pr^{3+}$-$Yb^{3+}$ codoped fluoride fiber for 1.3 μm amplification, IEEE Photon Technol. Lett., vol. 3. No. 11, pp. 990–992 (1991); and J. Y. Allain et al, Energy transfer in $Pr^{3+}/Yb^{3+}$-doped fluorozirconate fibres, Electron. Lett., vol. 27, pp. 1012–1014, (1991)).

With a sensitizer, the range of wavelengths over which the $Pr^{3+}$ ion can be activated is extended due to a process called cross-relaxation, where energy is transferred from the $Yb^{3+}$ ion residing in the 2F5/2 state and the $^1G_4$ state of the $Pr^{3+}$ ion. This allows for great flexibility in choosing laser pump wavelengths. Blue light generation has been demonstrated using a Ti-sapphire laser operating at 850 nm to a pump $Yb^{3+}$ sensitized $Pr^{3+}$-doped fluoride fiber laser.

Figure 2:
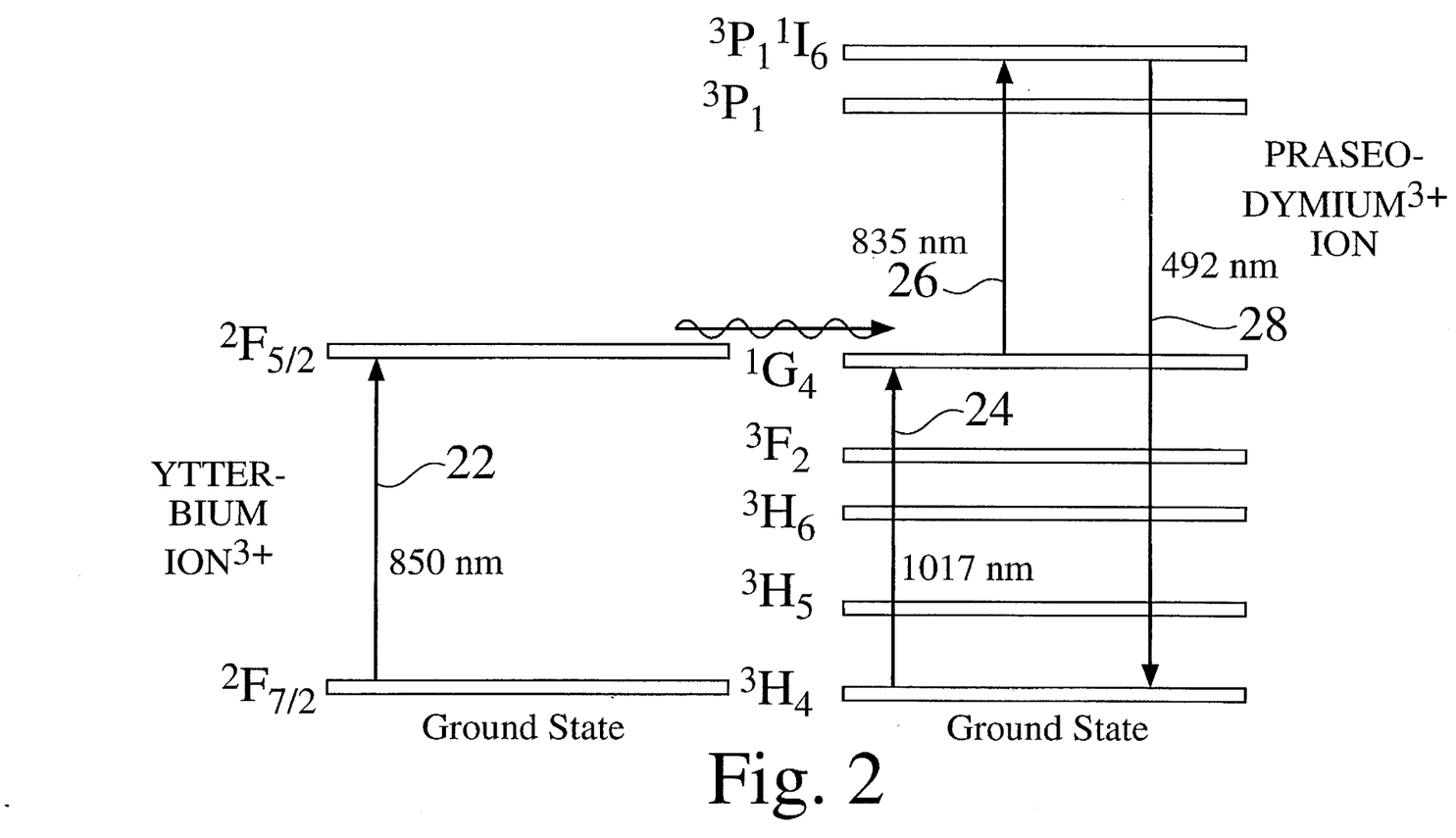
FIG. 2 is an energy level diagram showing a pumping method and transitions when using cross relaxation pumping for the $Pr^{3+}$ fluoride upconversion laser.

FIG. 2 is an energy level diagram showing a pumping method and transitions when using cross relaxation pumping for the $Pr^{3+}$ fluoride upconversion laser. In the figure, one pump photon 22 creates GSA to the $^1G_4$ (100 μs) level, while another pump photon 26 boosts the $Pr^{3+}$ ion from that energy level or some decayed level above the ground state to the desired 3P0 level. The excited ion 28 in this state has favorable branching to the ground state which is used as a lasing transition. This method is advantageous since the peak absorption coefficient of the $Yb^{3+}$ is almost two orders of magnitude greater than the peak $Pr^{3+}$ absorption at 1017 nm. This permits the realization of shorter lasers than with lasers doped strictly with $Pr^{3+}$.

Known cavity designs for the $Pr^{3+}$ blue laser consist of Fabry-Perot designs where dielectric mirrors are butted against cleaved or polished end facets with the pumping schemes indicated above. Pump combining has been achieved through the use of polarization beam combining. Recently, France Telecom announced a fluoride fiber laser having $TiO_2$-$SiO_2$ multi-layer dielectric mirrors directly coated to the fiber endfaces (see Fiber Optics Newswire, Avelon Corp (3 Jul. 1995)).

Unfortunately, the state of the art is such that none of the presently known designs are manufacturable, either in terms of size, energy requirements, and/or cost of manufacture. It would therefore be advantageous to provide a small, low cost, low energy consumption laser that generates blue light.

SUMMARY OF THE INVENTION

The invention herein provides a laser that is capable of generating a blue light, where the laser is based on an upconversion technique using a fluoride glass fiber doped with the rare-earth praseodymium. This approach provides a fiber guided structure having excellent mode characteristics, low sensitivity to pump wavelength, a self-aligned solid-state cavity, and emission at 492 nm. The emission wavelength of 492 nm offered by the $^3P_0$–$^3H_4$ praseodymium transition is preferable to 450 nm in certain bioscience applications.

One aspect of the invention provides a number of design innovations that advance the art towards a manufacturable laser design. Thus, the invention herein provides techniques for $Pr^{3+}$ ion excitation, mirror attachment, pump combining, and noise suppression. One preferred embodiment of the herein disclosed upconversion laser uses a combination of cross-relaxation pumping of the Pr-ion and direct pumping of the GSA-$^1G_4$ transition to cause laser emission from the $Yb^{3+}$ excited state transition.

In the preferred laser design, fiber gratings are employed to reflect light at 1017 nm to form part of the oscillator cavity at 1017 nm. The other end of the cavity is formed at the output coupler. Pumping at about 850 nm thus inverts the $Yb^{3+}$ population sufficiently to overcome mirror and cavity loss, and allow lasing that increases the Yb3+GSA.

Part of the light at 1017 nm undergoes GSA by the $Pr^{3+}$ ions, thus permitting population of the $Pr^{3+}$ ion $^1G_4$ level. Subsequent excited state absorption of the 850 nm pump photons populate the blue transition in the $Pr^{3+}$ ions. The blue cavity is formed by a direct deposited mirror that acts as the output coupler, and a fiber Bragg grating (FBG) that provides 100% reflection at 492 nm. Potential light oscillation at 521 nm, 605 nm, and 635 nm must be suppressed by ensuring high mirror loss at these wavelengths.

The light output from a single-stripe semiconductor pump is imaged to an expanded core, with respect to the fluoride core. Reflected light from the lens or fiber facet are effectively isolated by both the laser polarization characteristic, and by passing the light output through a ¼λ plate. This reduction of feedback results in improved stabilization of the blue laser. Optionally, a polarizer between the ¼λ plate and the semiconductor pump is used if feedback suppression is inadequate.

The pump light passes through the 1017 nm FBG and then to an adiabatic taper connected silica fiber, where the expanded core silica fiber is mode-matched to the fluoride fiber. The adiabatic taper is formed naturally in the process of fusion splicing. After passing through the adiabatic joint, the pump light passes through either a second FBG or a evaporated mirror at the fiber cleave. The FBG or evaporated mirror forms part of the blue cavity.

The pump light next traverses the glued joint and is absorbed in the $Pr^{3+}$/$Yb^{3+}$ doped fluoride fiber. For the case of dual pumping, where two pump lasers are used, a wavelength division multiplexer (WDM) is used instead of polarization beam combining.

A significant advantage of the herein disclosed design is that it provides mode-matching for the upconversion laser and the opportunity to write FBGs to define the blue cavity. By making the cavity symmetrical, FBG technology is readily applied to both ends of the cavity, allowing for accurate narrow band mirrors. By oscillating the $Yb^{3+}$ transition at 1017 nm, the absorption rate by the $Pr^{3+}$ ions is increased because such rate is intensity dependent. Additionally, standard cross-relaxation also occurs, which further increases pump absorption. Reduction of the cavity to direct-coated mirrors, such as λ/4 $TiO_2$/$SiO_2$ layers which reflect in the blue and transmit the pump wavelength, provides a simple cavity arrangement which uses the techniques herein described, but without the self-oscillating $Yb^{3+}$ transition.

DETAILED DESCRIPTION OF THE INVENTION

The lanthanide series of elements on the periodic chart, i.e. rare earths, are unique in that one can dope these elements in a glass, where the element outer electronic shells protect the inner electronic shells to a certain degree. Thus, transitions that occur in these elements are fairly well protected from the perturbing environment of the glass into which they are doped. Therefore, it is possible to dope these rare earths into glass, and their basic energy transitions remain intact, even though they are in a host that exerts local electrical fields on the atoms. With regard to the invention herein, such transitions are present in the ion in a silica host, referred to herein as an oxide glass. If such elements are doped in a certain fluoride fiber, then they fluoresce. That is, a photon activates the top level of the $^3P_1$ level shown in FIG. 1 (discussed above). The ion remains in that energy state for a certain amount of time. The lifetime of the ion in that state is sufficiently long so that it fluoresces light to the ground state. The color of the light or the energy of the photon is dependent on essentially the energy gap that the photon makes. In FIG. 1, the $^3P_1$ to the $^3H_4$ levels correspond to a fairly large energy of the corresponding wavelength, which is 492 nm (blue).

One problem of upconversion is that it is difficult to generate visible light in a compact form. For example, with regard to FIG. 1, a long wavelength laser diode operating at 1017 nm could be used to promote the ion from the 3H4 energy level to the 1G4 energy level. Once the ion remains in that state, and if it remains in that state for a long time, because it is in a good fluoride fiber host, then it is possible to use a second laser operating at 835 nm, and then promote that ion up to the higher energy state. The ion then stays at that higher level for a certain interval length of time. That level is called a metastable state, and is typically about 40 microseconds in duration. If the duration of this level is long, then there is the possibility of stimulated emission occurring with this ion. If, instead of a 40 microsecond duration in that energy state, it is only 1 nanosecond, then the possibility of stimulated emission is quite reduced.

The upconversion process relies on two critical factors:

Having a longer wavelength laser diode corresponding to absorption energies for the rare earth ion in the glass fiber. In this case, the FIGS. 1 and 2 laser diodes; and Having long lived ions at cited energy levels that permit fluorescence to some lower energy level.

Thus, upconversion means converting energy through multiple pump photon absorption to shorter wavelengths. Upconversion may be provided by operating at different long wavelengths, i.e. 835 nm or 1017 nm; or using a single laser pump, but with multiple absorptions of that pump, e.g. cross relaxation pumping using a 850 nm semiconductor pump.

Long wavelength pumps are less expensive. The invention herein pumps a rare earth, ytterbium, up to its energy level. Then because the ytterbium is in close proximity with a praseodymium ion, an energy transfer occurs where energy goes from the ytterbium ion $^2F_{5/2}$ bypass level to the praseodymium $^1G_4$ level. Then a second absorption of pump at about 835 nm can take the ion up to the higher levels. Thus, the upconversion process occurs where inexpensively generated laser light at 850 nm is converted into expensive light at 492 nm.

In operation, a fluoride fiber is pumped as part of the upconversion process by an 850 nm pump. The light then goes into the core of the fiber and activates the ions in the dopant (for example, as shown on FIG. 2). The doping level in the fiber is on the order of 1000 to 10,000 parts per million, i.e. for every million molecules of glass there are between 1,000 and 10,000 ions in the glass. The ions absorb the pump light and, as a result, are promoted to higher energy levels. Once at those higher energy levels, a spontaneous emission radiates and is confined because a cavity is formed by the mirrors on each end of the fiber. That is, the light bounces back and forth, creating stimulated emission.

Figure 3:
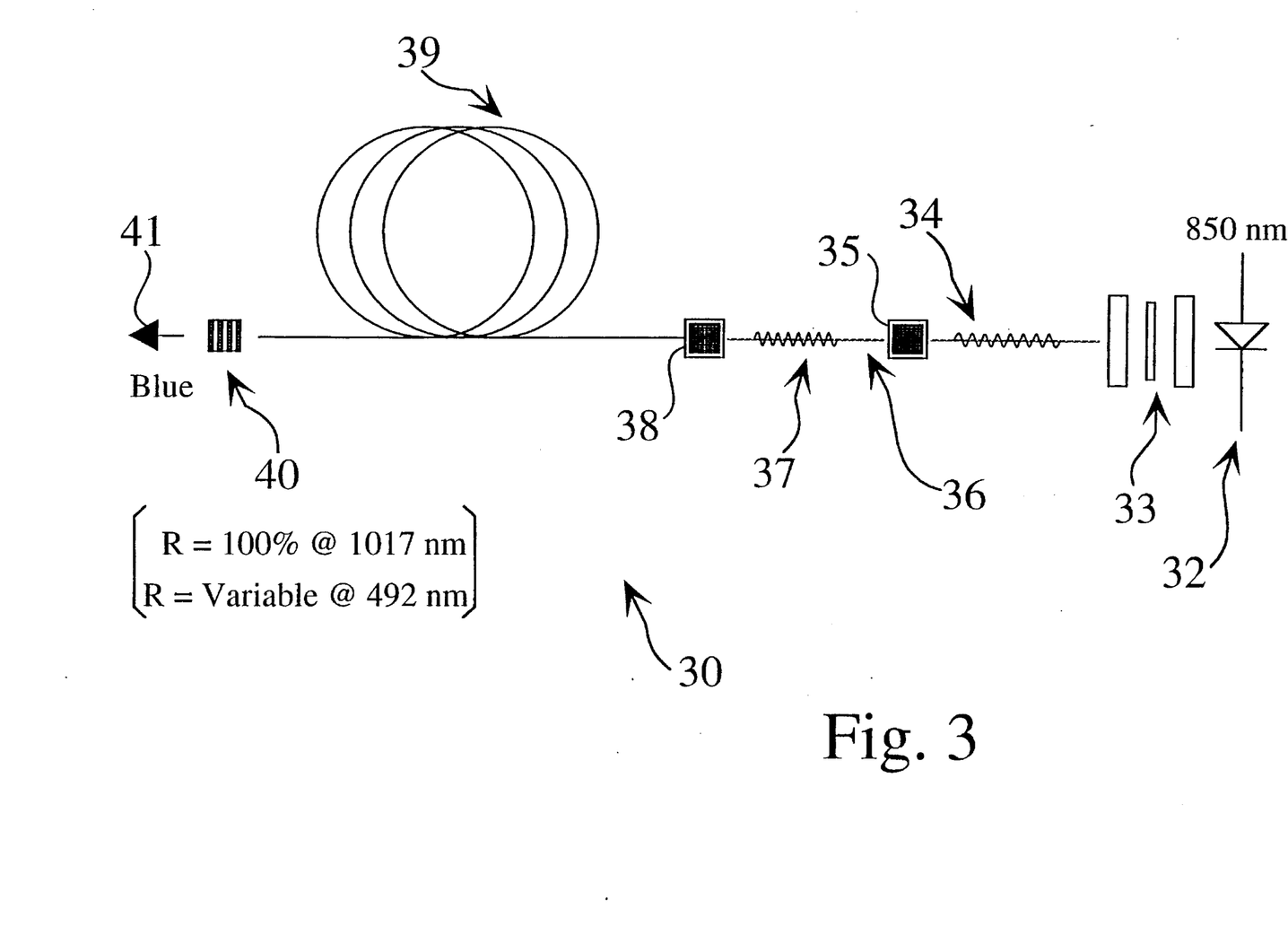
FIG. 3 is schematic diagram of an upconversion laser for generating blue light, preferably in the emission wavelength of 492 mm, according to a first embodiment of the invention.

FIG. 3 is a schematic diagram of an upconversion laser 30 for generating blue light, preferably in the emission wavelength of 492 nm, according to the invention. The laser employs a combination of cross-relaxation pumping of the Pr-ion and direct pumping of the ground state absorption GSA-$^1G_4$ transition as a result of laser emission from the Yb$^{3+}$ excited state transition. In the preferred design, fiber Bragg gratings (FBGs) 34 are employed to reflect light at 1017 nm to form a first end of a 1017 nm oscillator cavity. A second end of the cavity is formed at an output coupler 40.

Pumping at about 850 nm inverts the Yb$^{3+}$ population sufficiently to overcome mirror and cavity loss and allow lasing, which increases the Yb$^{3+}$ GSA. Part of the light at 1017 nm then undergoes GSA by the Pr$^{3+}$ ions, permitting population of the Pr$^{3+}$ ion $^1G_4$ level. Subsequent excited state absorption of the 850 nm pump photons populate the blue transition in the Pr$^{3+}$ ions.

The blue cavity is formed by a direct deposited mirror 40 that acts as an output coupler, and a FBG 37 which provides 100% reflection at 492 nm. Note that potential light oscillation at 521 nm, 605 nm, and 635 nm must be suppressed by ensuring high mirror loss at these wavelengths.

The light output from a single-stripe infrared semiconductor pump 32 is imaged by a 4× imaging system 33 (that includes a ¼λ plate) to an expanded silica core (FBG 34), with respect to the fluoride core 39. The infrared semiconductor pump may be a semiconductor laser diode that emits on the order of 500 milliwatts of light in a single spatial mode, which allows imaging to a single spatial mode of fiber. For example, as manufactured by Spectra Diode Laboratories, Inc. The imaging system is preferably a set of cylindrical lenses attached next to the infrared semiconductor laser diode, for example as manufactured by Blue Sky Technologies of San Jose, Calif. This particular lens arrangement allows some amount of circularization of a beam produced by the semiconductor laser. Non-circular beams typically do not focus well into a silica fiber.

Reflected light from the lens or fiber facet is effectively isolated by the combination of the laser polarization characteristic, and by passing the output light through the ¼λ plate. Such reduction of feedback improves stabilization of the blue laser, as was experimentally confirmed by the inventor on Tm$^{3+}$ and Er$^{3+}$ blue and green upconversion lasers.

The pump light passes through the 1017 nm FBG 34 and then to an adiabatic taper 35 which is connected to the expanded core silica fiber that is spatially mode-matched to the fluoride fiber. The application of mode-matched fibers to 1.3 μm optical amplifiers is known. The adiabatic taper is formed naturally in the process of fusion splicing. After passing through the adiabatic joint, the pump light passes through either a second FBG 37 or an evaporated mirror at the fiber cleave. The FBG or evaporated mirror form part of the blue cavity.

The pump light next traverses the glued joint 38 at which the second FBG joins the fluoride fiber 39 and is absorbed in the Pr$^{3+}$/Yb$^{3+}$ doped fluoride fiber. Optical cements, such as any standard optical adhesive or optical epoxy, may be used to form the glued joint. For example, such as are manufactured by Tra-Con, Inc. of Medford, Mass.

For the case of dual pumping, where two pump lasers are used (see below in connection with FIG. 5), a wavelength division multiplexer is used instead of polarization beam combining as is taught in the literature (see, for example Y. Zhao et al, Efficient blue Pr$^{3+}$-doped fluoride fibre upconversion laser, Electron. Lett., vol. 30, pp. 967–968 (1994)). The advantage of this approach, which is often used in telecommunications applications, is that an achromatic lens setup is not required, and fiber alignment problems are separated for the two pump lasers.

One advantage of the herein disclosed invention is that it provides mode-matching for the upconversion laser and the opportunity to write FBGs to define the blue cavity. By making the cavity symmetrical, FBG technology is readily applied to both ends of the cavity, allowing for accurate narrow band mirrors. By oscillating the Yb$^{3+}$ transition at 1017 nm, the absorption rate is increased by the Pr$^{3+}$ ions because this rate is intensity dependent. Additionally, standard cross-relaxation also takes place, which further increases the pump absorption. Reduction of the cavity to direct-coated mirrors, such as λ/4 TiO$_2$/SiO$_2$ layers which reflect in the blue and transmit the pump wavelength, provides a simple cavity arrangement that uses the techniques described herein, that may be with or without a self-oscillating Yb$^{3+}$ transition. The mirror is preferably coated with titanium dioxide and silicon dioxide, such that there are two dielectrics having different dielectric constants that form a kind of a transformer. The coating is applied an evaporator under a vacuum, preferably using low temperature evaporation at 100° C., using known techniques.

An upconversion laser for the generation of blue light is thus disclosed that incorporates FBGs, mode-matching fibers, pump noise reduction, pump combining, and a self-oscillating pumping scheme. This allows the use of a single wavelength pump laser to pump through a standard cross-relaxation method of $Yb^{3+}$ to $Pr^{3+}$, as well as a self-oscillating pumping method. Narrowband mirrors, such as FBGs, may also be used for the upconversion laser to allow suppression of parasitic oscillators.

The fluoride fiber used herein preferably has a diameter of about 250 microns, and is preferably about 0.75 meters long. The fiber can be either straight, or it can be wrapped into a coil, for example having a one inch diameter. The fiber itself can be coiled fairly small. The fiber has a polyimide coating around it to protect it from water. The coating diameter is about 250 microns. A cladding diameter which comprises the fluoride portion of the fiber is about 125 microns. The core region where the dopants are located is about 2 microns in diameter.

The fluoride fiber used to practice the invention is preferably of a type available from either Le Verre Fluore of Brittany, France (low background loss single-mode fluoride glass laser fibers) and Galileo Electro-Optics Corp. of Sturbridge, Mass. (Fluorolase™ doped fluoride fiber). The numerical aperture of the fiber is on the order of 0.1 to 0.5. The doping levels of the fibers are preferably about are 10,000 parts per million ytterbium, and about 1,000 parts per million of praseodymium. Because each rare earth has a different energy diagram, it behaves differently. Thus, any dopant may be used that provides an energy transition profile which falls within a desired light wavelength.

One advantage of including a silica fiber in the herein disclosed laser design is that it makes it easier to test the resulting imaging of pump light into fiber. Thus, when the laser is manufactured, a defect can be quickly located and corrected by testing because the silica fiber is easy to work with, as opposed to the fluoride fiber which is more difficult to work with. Having the intermediate silica fiber is an aid for manufacturing.

Because the intermediate fiber is silica, it is possible to use fusion splicing. One problem is that the silica fiber may not be of the appropriate mode field or spatial extent with regard to the pump light. The nature of the light might not be compatible with this light fiber. Accordingly, an intermediate silica fiber is used that is mode matched to the fluoride fiber. Thus, the preferred embodiment of the invention has two silica fibers, each having different modal characteristics. Alternative embodiments of the invention may have only a single silica fiber. Other embodiments of the invention may dispense with the silica fiber altogether.

Figure 4:
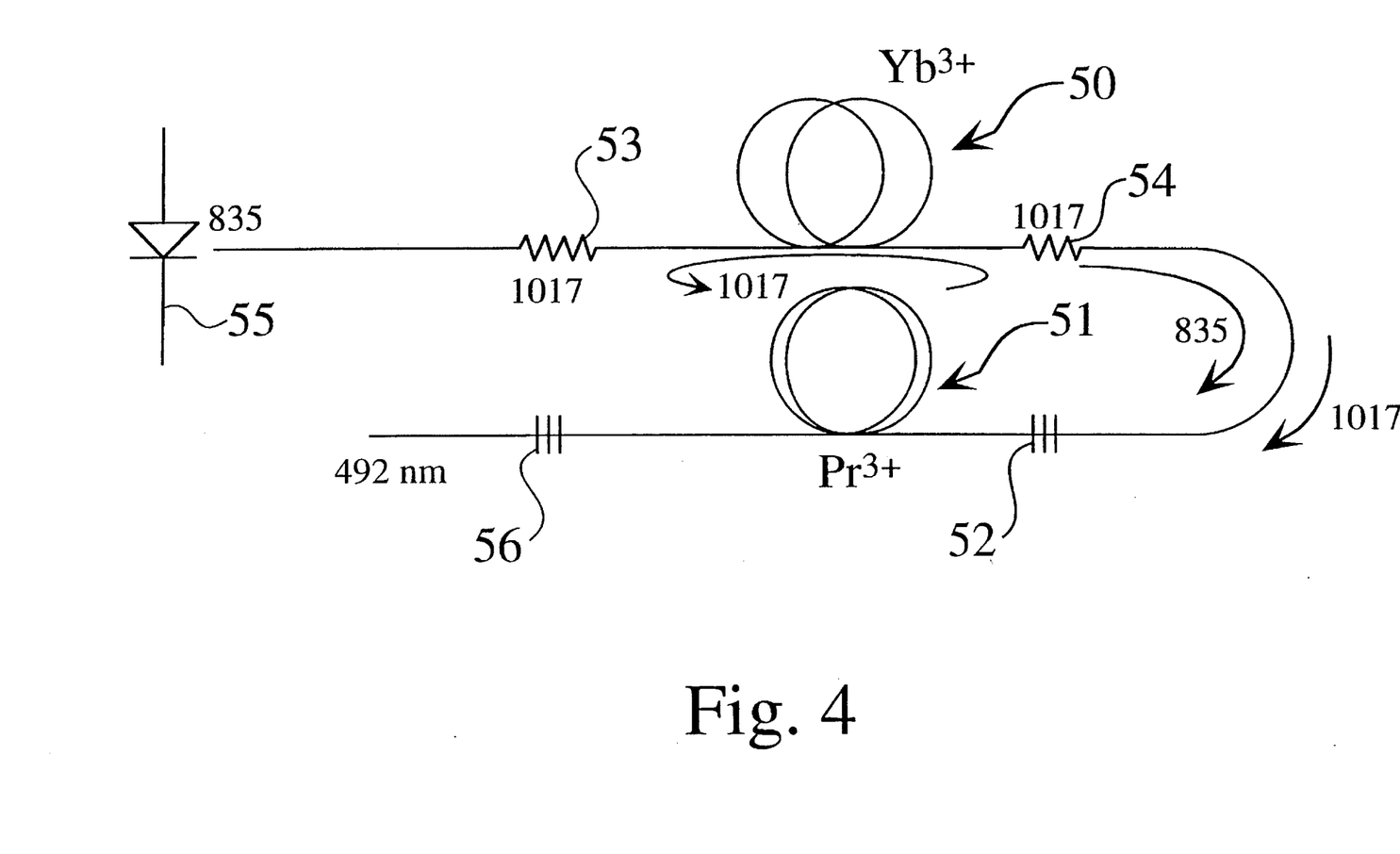
FIG. 4 is a schematic diagram of a dual oscillating upconversion laser for generating blue light according to an alternative, equally preferred embodiment of the invention.

FIG. 4 is a schematic diagram of a dual oscillating upconversion laser for generating blue light according to an alternative, equally preferred embodiment of the invention. This embodiment of the invention uses a single pump 55 that operates at a wavelength of 835 nm. Alternatively, a cladding pumping scheme may be used where the optical power of a multistripe laser 55 is coupled into the core and cladding of the ytterbium doped laser cavity 50. The laser cavity includes a silica fiber 50 and a ZBLAN zirconium fluoride fiber 51 that are doped with ytterbium and praseodymium, respectively. A pair of FBGs 53, 54 operate at 1017 nm. The ytterbium fiber provides ions that lase at 1017 nm, thereby providing an auxiliary pump to the praseodymium fiber.

Figure 5:
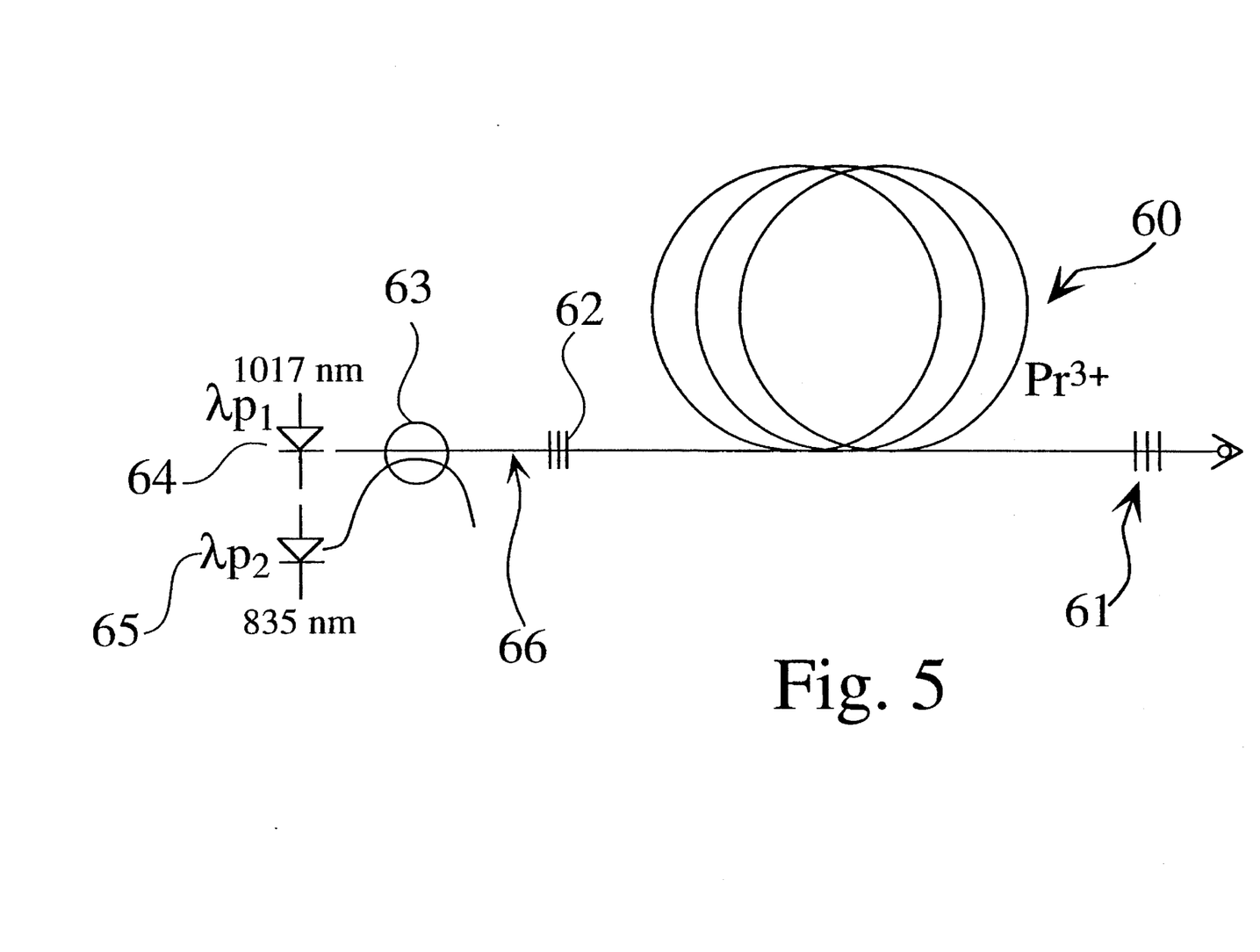
FIG. 5 is a schematic diagram of a dual pump upconversion laser for generating blue light according to another alternative, equally preferred embodiment of the invention.

FIG. 5 is a schematic diagram of a dual pump upconversion laser for generating blue light according to another alternative, equally preferred embodiment of the invention. This embodiment of the invention provides a separate 835 nm laser pump 65 and a 1017 nm laser pump 64 that are joined at a wavelength division multiplexer (WDM) 63, which is able to couple most of the energy of the 835 nm light to the path 66. Likewise, the WDM is also able to couple most of the 1017 nm light to the path 66. Thus, the WDM is an efficient means of combining two lasers. This permits coupling of two pump lasers, which allows the coupling of light into a praseodymium doped cavity 60. The cavity also includes a pair of coated mirrors 61, 63.

In this embodiment of the invention, both laser pumps are always present, where one pump is always boosting the ion up to a first level, and the second pump is always boosting the ion up to the next level from that level. Thus, the 1017 nm pump boosts the ion to the $^1G_4$ level, and the 835 nm pump then boost the ion up to the $^3P_0$ level.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

I claim:

1. An upconversion laser for generating blue light at a wavelength of substantially 492 nm, the laser comprising:

an optical cavity, said optical cavity being resonant at least at a wavelength of light emitted by ytterbium ions falling from a $^2F_{5/2}$ state;

one and only one laser pump optically coupled to said optical cavity, said laser pumps generating light at a wavelength shorter than said wavelength of said light emitted by said ytterbium ions; and a ytterbium/praseodymium doped fluorine fiber in said optical cavity, in which a first energy transfer occurs by cross relaxation in which energy from said laser pump raises a ytterbium ion to a $^2F_{5/2}$ state, and is transferred from said ytterbium ion at said $^2F_{5/2}$ state to said fiber to raise a praseodymium ion to a $^1G_4$ state, and in which a second energy transfer directly from said laser pump further excites said praseodymium ion in said $^1G_4$ state to a $^3P_0$ state from which said praseodymium ion falls to a ground state resulting in blue light emission at the wavelength of substantially 492 nm.

2. The laser of claim 1, wherein said laser pump generates energy at a wavelength of 850 nm.

3. The laser of claim 1, further comprising: a mirror on each end of said fluoride fiber, said mirrors and said fluoride fiber forming a cavity in which light bounces back and forth, generating stimulated emission.

4. The laser of claim 1, further comprising:

an imaging system positioned in an optical path between said laser pump and said fluoride fiber.

5. The laser of claim 4, said imaging system further comprising:

a ¼λ.

6. The laser of claim 1, further comprising: at least one silica fiber for optically coupling said laser pump and said fluoride fiber.

7. The laser of claim 6, further comprising:

a first silica fiber for receiving light from said laser pump at a first end thereof; and a second silica fiber, having a first end optically coupled to a second end of said first silica fiber by a mode matching joint, and having a second end optically coupled to said fluoride fiber by a spliced joint.

8. The laser of claim 1, further comprising: at least one fiber Bragg grating situated within an optical path between said laser pump and said fluoride fiber.

9. An upconversion laser for generating blue light at a wavelength of substantially 492 nm, the laser comprising:

a laser pump;

a fluoride fiber optically coupled to said laser pump, said fluoride fiber comprising a cross-relaxation pump wherein $Yb^{3+}$ ground state absorption is increased and energy from said increased ground state absorption is transferred to a Pr-ion to raise said Pr-ion to a $^1G_4$ state; and a direct pump wherein the energy level of said Pr-ion in said $^1G_4$ state is further increased from said $^1G_4$ state to a $^3P_0$ state, from which said Pr-ion falls to a ground state, resulting in blue light laser emission at the wavelength of substantially 492 nm;

an imaging system for imaging light from said laser pump onto said fluoride fiber;

a fiber grating for reflecting light at a first wavelength to form a first end of an oscillator cavity, along with said fluoride fiber, at said first wavelength; and an output coupler for forming, along with said fluoride fiber, a second end of said cavity.

10. The laser of claim 9, wherein said output coupler is a direct deposited mirror.

11. The laser of claim 9, wherein light output from said laser pump is imaged to an expanded core, with respect to said fluoride fiber.

12. The laser of claim 9, wherein reflected light from said imaging system is effectively isolated by means selected from the group consisting of a ¼λ plate and a polarizer.

13. The laser of claim 9, further comprising:

a fiber grating through which laser pump light passes;

a silica fiber optically coupled between said laser pump and said fluoride fiber; and an adiabatic taper connected said silica fiber, where an expanded core of said silica fiber is mode-matched to said fluoride fiber.

14. The laser of claim 13, wherein said adiabatic taper is formed naturally in the process of fusion splicing.

15. The laser of claim 13, wherein a part of said cavity is formed from a member selected from the group consisting of a second fiber grating and a minor at a fluoride fiber cleave.

16. An upconversion laser for generating blue light at a wavelength of substantially 492 nm, the laser comprising:

a laser pump;

a fluoride fiber optically coupled to said laser pump, said fluoride fiber comprising a cross-relaxation pump wherein $Yb^{3+}$ ground state absorption is increased and energy from said increased ground state absorption is transferred to a Pr-ion to raise said Pr-ion to a $^1G_4$ state; and a direct pump wherein the energy level of said Pr-ion in said $^1G_4$ state is further increased from said $^1G_4$ state to a $^3P_0$ state, from which said Pr-ion fall to a ground state, resulting in blue light laser emission at the wavelength of substantially 492 nm;

an imaging system for imaging light from said laser pump onto said fluoride fiber;

a fiber grating for reflecting laser pump light passed through said fiber grating at a first wavelength and forming, along with said fluoride fiber, a first end of an oscillator cavity, at said first wavelength;

an output coupler for forming, along with said fluoride fiber, a second end of said cavity;

a silica fiber optically coupled between said laser pump and fluoride fiber, where an expanded core of said silica fiber is mode-matched to said fluoride fiber; and an adiabatic taper connected to said silica fiber.

17. A method for generating blue laser light, comprising the steps of:

imaging light output from a single-stripe infrared semiconductor pump and imaging system to an expanded silica core disposed about a fluoride fiber;

isolating reflected light from said imaging system by passing an output light through a ¼λ plate;

passing the pump light through a fiber grating and then to an adiabatic taper which is connected to an expanded core silica fiber that is mode-matched to said fluoride fiber;

passing the pump light through a second fiber grating;

traversing the pump light across a glued joint at which the second fiber grating joins said fluoride fiber.

18. The method of claim 17, further comprising the step of: pumping said fluoride fiber with two laser pumps, where a wavelength division multiplexer is used to couple energy from each of said laser pumps to said fluoride fiber.

* * * * *

UNITED STATES PATENT AND TRADEMARK OFFICE
CERTIFICATE OF CORRECTION

PATENT NO. : 5,621,749
DATED : April 15, 1997
INVENTOR(S) : Douglas M. Baney

It is certified that error appears in the above-identified patent and that said Letters Patent is hereby corrected as shown below:

Column 8, line 45, "said laser pump" should read
-- said pump --;

Column 8 line 48, "a ½λ " should read
-- a ½λ plate" --;

Column 8, line 51, " said laser plate" should read
-- said pump --;

Column 8, line 53, " said laser pump" should read
-- said pump --;

Column 8, line 62, " said laser pump" should read
-- said pump --.

Signed and Sealed this

Twenty-fourth Day of November, 1998

Attest:

BRUCE LEHMAN

Attesting Officer      Commissioner of Patents and Trademarks